May 13, 1958 E. D. COOK 2,834,202
APPARATUS FOR MEASURING HARDNESS
Filed June 27, 1955 2 Sheets-Sheet 1

Inventor
Ellsworth D. Cook
by Merton D. Moore
His Attorney

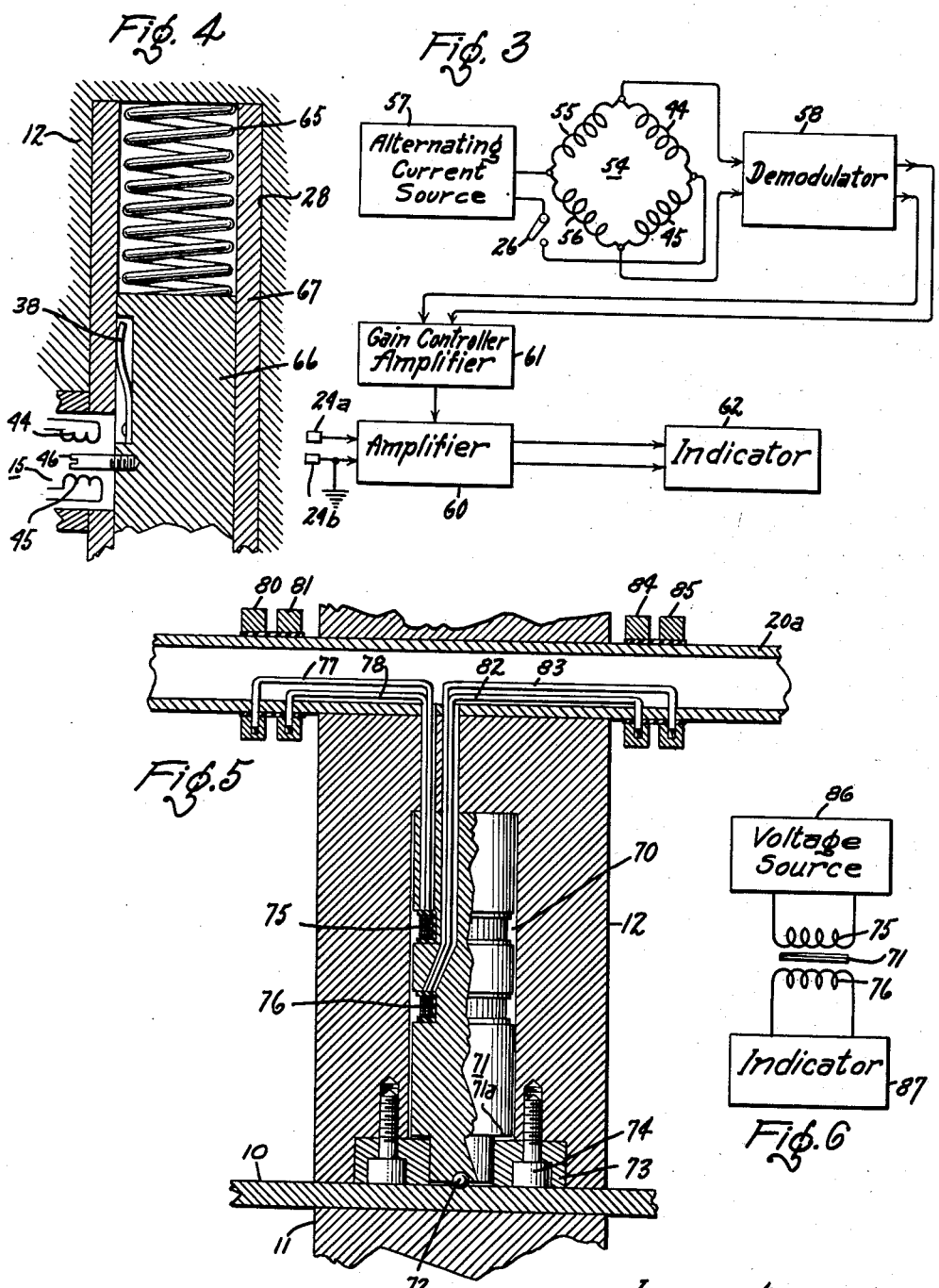

United States Patent Office 2,834,202
Patented May 13, 1958

2,834,202

APPARATUS FOR MEASURING HARDNESS

Ellsworth D. Cook, Scotia, N. Y., assignor to General Electric Company, a corporation of New York Application June 27, 1955, Serial No. 518,282

20 Claims. (Cl. 73—81)

This invention relates to apparatus for measuring the hardness of a material and, more particularly, to apparatus that may be adapted to measure hardness of a rapidly moving strip material.

In the production of various materials, such, for example, as strips of steel, it is desirable to measure the hardness of the material at one or more points in the manufacturing process in order to control the product to fit the eventual user's specifications. Devices heretofore provided for making such a measurement have not been well adapted for production line installation and have been more suitable for laboratory use. Accordingly, a primary object of the present invention is to provide such apparatus that is suitable for use in heavy industrial applications, such as in the production of steel strips where the apparatus measures the hardness of a strip as it rapidly emerges from a processing machine.

Another object of the invention is to provide such apparatus that produces indications of the hardness of a moving strip or sheet of material at regularly spaced points along the length of the material.

Another object is to provide apparatus for measuring the hardness of a moving strip or sheet of material in which the speed of movement of the material does not affect the measurement.

Another object is to provide apparatus for measuring hardness either continuously or intermittently during the production process.

A further object is to provide apparatus that produces an indication of the hardness of a material in such form that it may be utilized to control other apparatus.

It is known that the hardness of a material may be determined by making an indentation in the surface of the material and measuring the depth of the indentation and the force exerted to make the indentation. The ratio of force exerted to depth of indentation made is an indication of the hardness of the material under test. It is a further object of the present invention to provide apparatus for determining the hardness of a material in accordance with the method set forth above.

Apparatus constructed in accordance with the invention may comprise a support member and indenting means carried by the supporting member for making an indentation in the material whose hardness is to be tested. The indenting means has operatively associated therewith means for providing an indication of the depth of the indentation and means for providing an indication of the force exerted to make the indentation.

The invention may also be embodied in apparatus that functions to make an indentation of predetermined depth in the material being tested, whereby the force exerted to make that indentation provides an indication of the hardness of the material. Another embodiment of the invention provides apparatus wherein a constant force is exerted to make an indentation in the material under test, and the depth of the indentation is inversely related to the hardness of the material.

The novel features which are believed to be characteristic of the invention are set forth with particularity in the appended claims. The invention itself, however, both as to its organization and method of operation, together with further objects and advantages thereof, may best be understood by reference to the following description taken in conjunction with the accompanying drawing, in which Fig. 1 is a perspective view of a typical installation embodying the apparatus of the invention;

Fig. 2 is an enlarged sectional view taken on a radial plane through the wheel 12 of Fig. 1 extending through the center of the indenting means 13 parallel to the shaft 20;

Fig. 3 is a schematic diagram of the electrical circuit of the apparatus illustrated in Fig. 2;

Fig. 4 is a partial enlarged sectional view similar to a portion of Fig. 2 but illustrating a modification of the apparatus of the invention;

Fig. 5 is an enlarged sectional view similar to Fig. 2, but showing another modification of the apparatus; and Fig. 6 is a circuit diagram of the electrical portion of the modification shown in Fig. 5.

Figure 1:
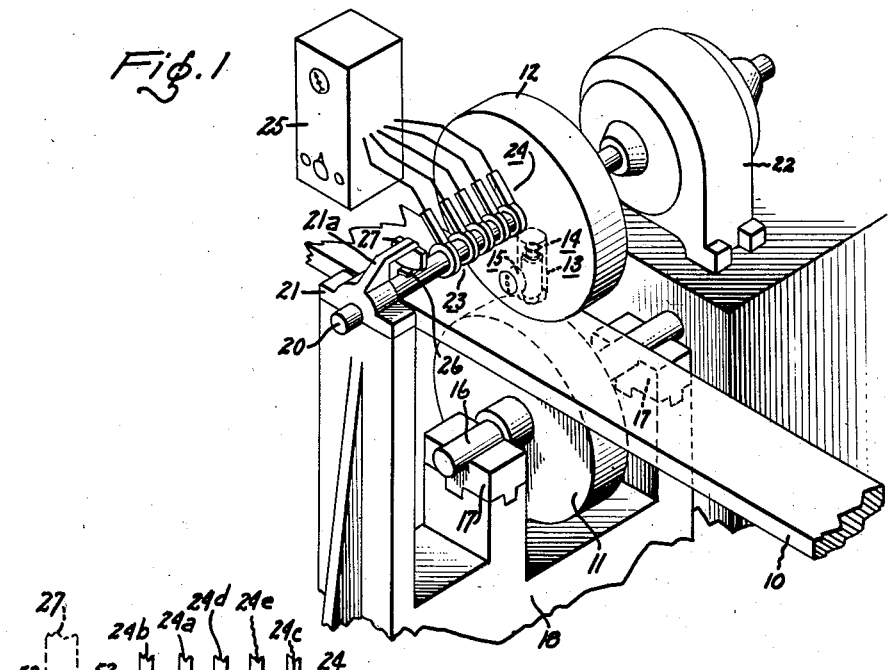

Fig. 1 illustrates a typical installation embodying apparatus constructed in accordance with the invention for measuring the hardness of a strip material, such as a steel strip 10. The strip 10 is illustrated as passing between a supporting wheel 11 and an indenting wheel 12 which carries indenting means 13, force exerting and detecting means 14, and indentation depth detecting means 15.

The supporting wheel 11 is carried on an axle 16, which may be mounted for rotation on bearing surfaces formed on blocks 17 that are mounted on the supporting structure 18 of the installation. Alternatively, the axle 16 may be fixedly supported and the wheel 11 suitably mounted for rotation on the axle. The primary purpose of the supporting wheel 11 is to provide a solid mass below the strip 10 being tested against which force may be applied by the indenting means 13 carried on the wheel 12.

The wheel 12 is fixed on an axle 20, one end of which is supported for rotation on suitable bearing surfaces formed on a portion of the structure 18 and is retained in position by a strap 21. The other end of the axle 20 may be mechanically connected to the rotor of a motor 22 that may be energized from a conventional alternating current supply (not shown). The purpose of the motor 22 is merely to reduce the friction that would otherwise occur on the peripheral surface of the indenting wheel 12 as the rapidly moving steel strip passes between the wheels 11 and 12 and causes them to rotate. It is obvious that the motor 22 may be eliminated if wear on the wheel 12 is of no concern, or if means are provided to derive power from the moving strip 10 initially to accelerate the wheel 12 to synchronize its speed with that of the strip 10.

As will be explained later in detail, the indenting means 13 carried by the wheel 12 has operatively associated therewith force exerting and detecting means 14 for exerting force on the indenting means 13 and for producing electrical signals whose amplitudes are related to the forces required to produce indentations in the steel strip 10 as the measuring wheel 12 rotates in contact with the steel strip, and indentation depth detecting and measuring means 15 for producing electrical signals whose amplitudes are related to the depths of the indentations. The electrical signals are supplied internally through the wheel 12 and the axle 20 to a plurality of slip rings, indicated generally by the numeral 23, that are mounted on the axle 20 and electrically insulated therefrom. A plurality of brushes, indicated generally by the numeral 24, cooperate with the slip rings 23 to supply the electrical signals to electrical circuitry 25, which will later be explained in detail.

The axle 20 may have mounted therein a momentary contact type of switch 26, which is actuated by a member 27 carried by an arm 21a extending from the strap 21. The switch 26 serves to energize the indentation depth measuring means 15 only during the time that an indentation is being made in the test strip 10.

The wheel 12 and its mounting means function to support the indenting means 13 and the means 14, 15 associated therewith for providing indications of the depths of indentations made in the steel strip and the forces exerted to make those indentations, and provide mass against which the forces may be exerted. It is seen from Fig. 2, which shows in detail an embodiment of the indenting means 13, the force exerting and detecting means 14 and the indentation depth measuring means 15, that the peripheral surface of the wheel 12 contacts the surface of the steel strip 10 under test. The wheel 12 is provided with a bore 28 extending inwardly from its peripheral surface, into which are inserted the indenting means 13 and the associated force exerting and detecting means 14.

The indenting means 13 comprises a sleeve 30, which slides into the bore 28 and may be secured therein by suitable means such as bolts 31 that extend through a flange 30a on the sleeve and into the wheel 12. The bolts 31 are countersunk below the outer surface of the sleeve 30 so that their heads do not come into contact with the surface of the steel strip 10, and the outer surface of the sleeve 30 does not extend outwardly beyond the peripheral surface of the wheel 12.

Slidably mounted within the sleeve 30 is a block-like indenter 32 having a ball 33 secured to the outer end thereof in position to make an indentation in the surface of the steel strip 10. It is understood that the ball 33 may be formed integrally with the indenter 32 as a protuberance thereon or may be made separately and secured thereto to provide for replacement to overcome wear. Alternatively, the ball 33 may be replaced by an element of any desired shape that will make an indentation in the metal strip 10 without requiring the use of undue force. The indenter 32 is retained within the sleeve by a shoulder 32a that engages an inner flange 32b formed on the sleeve 30.

The force exerting and measuring means 14 comprise a short, stiff coil spring 34, one end of which engages the inner end of the indenter 32 to exert force on the indenter to press the ball 33 into the surface of the steel strip 10 under test. A pair of disk-like piezoelectric elements 35a and 35b are interposed between the other end of the coil spring 34 and the inner end of the bore 28 to provide an indication of the force exerted by the spring 34.

It is known that the force exerted by a spring, such as the short coil spring 34, varies in accordance with the compression of the spring if the amount of compression is sufficiently great relative to the length of the spring. In the present instance, it may be generally expected that the indentation made in the surface of a hard steel strip or the like will be of the order of not more than several thousandths of an inch. Therefore, in order to have a variable force exerted by the spring, it must be quite short and relatively stiff. The spring 34 is shown as being longer than it would actually be in practice, for purposes of ease of description and illustration.

The force sensitive piezoelectric elements 35a, 35b may consist of a well-known material, such as quartz, barium titanate, lead metaniobate, or the like, and are so polarized that when force is applied between their major surfaces, the juncture of the elements develops a positive potential relative to the outer surfaces of the elements. The outer surfaces of the elements may be silvered in the customary manner to provide good electrical contact with the indenter 32 and end of the bore 28 between which they are retained.

In order to provide a convenient means for obtaining the positive potential developed on the inner surfaces of the piezoelectric elements 35a, 35b, an electrically conductive plate 36 may be placed therebetween, and the inner surfaces of the piezoelectric elements may be silvered in the usual manner to provide good electrical contact with the plate 36. The plate 36 is connected by a shielded conductor 37 to a slip ring 23a mounted on the shaft 20, as previously described. Another slip ring 23b is electrically connected to the shaft 20 and hence to the wheel 12 and sleeve 30. A leaf spring 38 has one end connected to the indenter 32 and its other end bears against the sleeve 30 in order to provide good electrical contact therebetween. Brushes 24a and 24b cooperate with slip rings 23a and 23b, respectively, to connect the force measuring means to the electrical circuitry to be later described.

As the wheel 12 rotates with its peripheral surface in contact with the steel strip 10 and the ball 33 comes into contact with the surface of the strip, force is exerted by the spring 34 to press the ball 33 into the surface of the strip 10. That force is also exerted on the piezoelectric elements 35a and 35b and causes a positive potential to appear on the inner surfaces of the elements relative to their outer surfaces. The inner surfaces of the elements are connected to the slip ring 23a through conductor 37 and the outer surfaces are connected to slip ring 23b through the apparatus so that the potential also appears between slip rings 23a and 23b. That potential has the form of a direct current pulse whose amplitude is related to the force exerted by the spring 34 on the indenter and hence on the strip 10, and whose width depends on the length of time that the ball 33 engages the strip 10.

The indentation depth measuring means 15 serves to provide an indication of the depth of the indentation made in the surface of the steel strip 10. The wheel 12 is provided with a bore 40 extending inwardly from one side of the wheel and through the side wall of the bore 28, within which the measuring means are located. The measuring means are mounted inside a sleeve 41 that removably fits within the bore 40 and bears against a shoulder 40a formed in the bore 40. The sleeve 41 is retained within the bore by a plug 42 that is threaded into the outer portion of the bore. Mounted within the sleeve 41 is an annular member 43 constructed of an insulating material which supports a pair of coils 44 and 45. The coils 44 and 45 are spaced apart to permit a portion of a magnetically permeable pin 46 to extend therebetween. The pin 46 is secured to the indenter 32 for movement therewith. One end of each of the coils 44, 45 is connected through a conductor 47 to the switch 26 and thence through a conductor 48 to a slip ring 23c. The other ends of the coils 44, 45 are connected by means of conductors 50 and 51, respectively, to slip rings 23d and 23e, respectively. Brushes 24c, 24d, and 24e cooperate with slip rings 23c, 23d, and 23e, respectively, to connect the depth measuring means to the electrical circuitry to be later described.

The relative positions of the coils 44, 45 and the pin 46 are such that when the outermost portion of the ball 33 is flush with the peripheral surface of the wheel 12, the pin 46 is midway between the two coils, and the self-inductances of the two coils are equal. However, when the ball 33 makes an indentation in the surface of the strip 10, the pin 46 momentarily moves farther from the coil 44 and closer to the coil 45, and the self-inductance of coil 44 decreases while the self-inductance of coil 45 increases. The change in inductance of each coil is proportional to the amount of movement of the pin 46 and hence is proportional to the depth of the indentation made in the strip 10 by the indenter 32.

As will be explained hereafter, the coils 44, 45 are connected into an electrical bridge circuit with the connection being made through the slip rings 23c, 23d, and 23e. In order to prevent the electrical bridge from being unbalanced during the time that the indenter 32 is not making an indentation in the strip under test, means may be provided to energize the coils 44, 45 only while an indentation is being made. One end of each of the coils 44, 45 is connected to the switch 26 through conductor 47 and thence to slip ring 23c through conductor 48. The circuit is completed through the switch 26 only while the indentation is being made.

The switch 26 comprises a movable arm 52 electrically connected to conductor 47 and a fixed contact 53 electrically connected to conductor 48. Normally, the arm 52 does not engage contact 53 so that the switch is normally open. However, as the shaft 20 rotates and the switch 26 passes under the member 27 fixed to the supporting structure as previously mentioned, the member 27 forces the arm 52 into engagement with contact 53. The switch 26 is so mounted on shaft 20 that the switch is closed only while an indentation is being made in the test strip 10.

It is understood that the mechanically actuated switch 26 may be replaced by an electronic switch, if the required speed of operation is beyond the capabilities of a mechanical arrangement.

Figure 2:
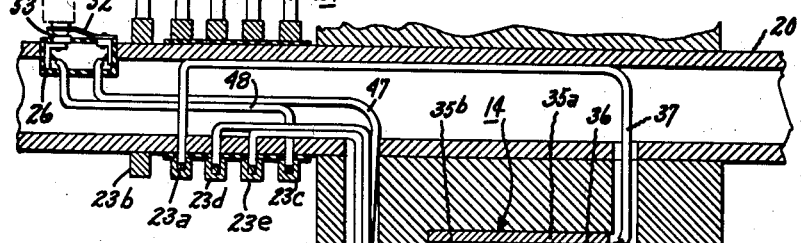
Figure 2:
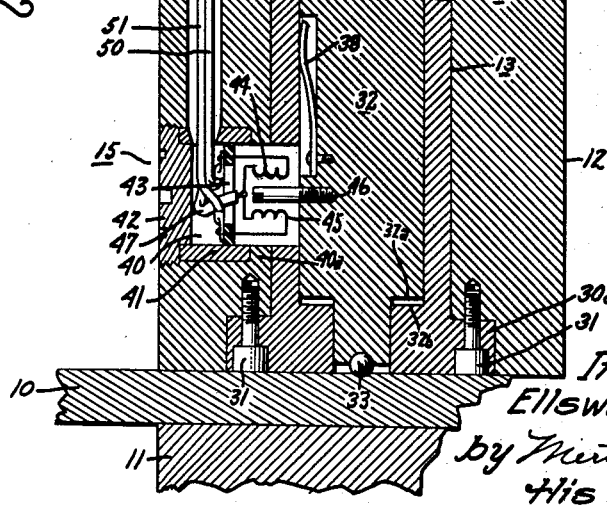

Fig. 3 illustrates the electrical circuit of the embodiment of the invention shown in Fig. 2. The coils 44, 45 of the indentation depth detecting means are shown as connected in a conventional bridge arrangement 54 with a pair of fixed impedances 55 and 56 having equal values of impedances. The bridge is energized from a conventional alternating current source 57 which is connected to the bridge between the fixed impedances 55, 56 and between the coils 44, 45, the latter connection being made through the switch 26 previously described. The output of the bridge 54 is taken from the opposite points between impedance 55 and coil 44 and between impedance 56 and coil 45. It is understood that connections to the coils 44, 45 are made through brushes 24c, 24d, 24e and slip rings 23c, 23d, 23e, as previously described. The brushes and slip rings are eliminated from Fig. 3 for purposes of simplicity.

As previously described, the position of the pin 46 carried by indenter 32 (Fig. 2) controls the self-inductances of the coils 44 and 45. When the coils 44, 45 have equal self-inductances, the bridge 54 is balanced and there is no alternating current output therefrom; when the self-inductances of the coils 44, 45 are not equal, the bridge 54 is unbalanced to provide an alternating current output signal with the amplitude of the signal being proportional to the unbalance of the bridge. The unbalanced condition of the bridge 54 exists momentarily while an indentation is being made in the steel strip 10. The momentary alternating current output signal is demodulated or rectified by a conventional demodulator 58 to provide a direct current pulse whose amplitude is proportional to the degree of unbalance of the alternating current bridge and so is proportional to the depth of the indentation made in the strip 10 under test.

The output of the piezoelectric force detecting means 14 (Fig. 2) is supplied from the brushes 24a, 24b, previously mentioned, to the input of a conventional direct current amplifier 60.

In order to obtain the ratio of the force exerted to the depth of indentation made, use is made of an automatic gain controlled amplifier 61 to which the direct current output pulses of the demodulator 58 are supplied. The gain controlled amplifier 61 may be a conventional type of amplifier, which is provided with automatic gain control, whereby the output of the amplifier remains constant regardless of variations in the input signal. In general, such amplifiers embody a detector circuit to provide a negative voltage to bias the amplifier tubes. As the input signal amplitude increases, the negative bias voltage increases to decrease the gain of the amplifier, and vice versa. Such amplifiers are well-known in the art, and no further explanation of their construction or operation is deemed necessary.

The gain controlling or biasing voltage of the amplifier 61 is also applied in the same manner to the amplifier 60. The output of amplifier 60 is supplied to an indicator 62, which may comprise a conventional peak detector and a direct current voltmeter to indicate the amplitude of the output of the peak detector. Alternatively, the indicator 62 may comprise a conventional cathode ray oscilloscope and the amplitudes of the pulses may be measured by means of a scale fixed to the face of the cathode ray tube.

The use of an automatic gain controlled amplifier, such as the amplifier 61, having its gain controlling or biasing voltage also supplied to the amplifier 60, provides a convenient means for obtaining a ratio or quotient because one of the quantities, in this case, the divisor, is maintained constant and the other quantity is varied to vary the quotient. In other words, regardless of the amplitudes of the input pulses to the amplifier 61, its output pulse amplitude remains constant, and the variation in gain applied in the amplifier 61 to maintain the output constant is also applied to the amplifier 60. Therefore, it is necessary only to measure the amplitudes of the output pulses of amplifier 60 to obtain the ratio of the amplitudes of the input pulses to the amplifier 60 to that of the input pulses to amplifier 61 because one factor of the ratio is constant. Other means for obtaining the ratio, such as a commercially available ratio meter, may be used and the invention is not limited to the use of an automatic gain controlled amplifier arrangement.

It is apparent from the preceding description of one embodiment of the invention that if either the depth of the indentation or the force required to make the indentation is mainained constant, the apparatus may be considerably simplified. Fig. 4 illustrates such a modification of the apparatus of the invention in which the short, force producing spring previously described is replaced by a much longer spring 65. The indentation depth measuring means 15 are as previously described for indicating the movement of an indenter 61, which is generally similar to, but somewhat shorter than, the indenter previously described. The indenter 66 is retained within a sleeve 67 that fits within the bore 28 in the wheel 12, and the spring 65 is interposed between the inner ends of the indenter 66 and bore 28 to force the indenter outwardly.

It is known that if a spring is compressed by an amount that is small compared to the length of the spring, the force exerted by the spring to resist the compression is essentially constant. The spring 65 is of sufficient length to operate in that manner. Hence, because constant force is exerted by the spring 65 through the indenter 66 to make an indentation in the material being tested, it is necessary only to measure the depth of the indentation and take the reciprocal of that value to obtain an indication of the hardness of the material.

The modification of the invention shown in Fig. 4 may utilize the electrical circuitry shown in Fig. 3 suitably modified to accommodate the lack of a force-proportional input signal. However, because the force exerted by the indenting means to make an indentation in the steel strip under test is constant, pulses of constant amplitude may be supplied to the input of amplifier 60 from a conventional pulse generator (not shown), and the circuit will operate in the manner previously described. In that case, the output pulses from the amplifier 60 are made to vary inversely as the amplitude of the input pulses to amplifier 61 because of the biasing voltage supplied from amplifier 61 to amplifier 60, as previously described. Thus, the indicator 62 may be calibrated in terms of hardness.

Alternatively, the amplifiers 60 and 61 may be eliminated and the output of demodulator 58 connected directly to the indicator 62. In that case, the scale on indicator 62 may be calibrated to indicate the reciprocal of its input pulse amplitude, which is proportional to hardness.

Fig. 5 shows another modified form of the invention in which the depth of the indentation made in the strip 10 under test is maintained constant and the force required to make that indentation is measured. The wheel 12 is provided with a bore 70 into which is inserted a cylindrical magnetostrictive bar 71 having a ball 72 formed on, or attached to, its outer end. The magnetostrictive element 71 is retained in the bore 70 by means of a ring 73 which engages a shoulder 71a formed on the element 71 and which may be held in place by bolts 74 that extend into the wheel 12. Of course, the ring 73 and bolts 74 do not extend outwardly beyond the peripheral surface of the wheel 12.

A pair of coils 75 and 76 are wound on the magnetostrictive element 71 with the coils spaced apart along the axis of the element 71 by a small amount. The ends of the coil 75 are connected by conductors 77 and 78 to slip rings 80 and 81, respectively, mounted on the axle 20a of the wheel. The ends of the coil 76 are similarly connected by conductors 82 and 83 to slip rings 84 and 85, respectively, also mounted on the axle 17.

The sizes of the magnetostrictive bar 71 and the ball 72 mounted thereon are such that a portion of the ball protrudes outwardly beyond the peripheral surface of the wheel 12. The magnetostrictive element 71 has high mechanical impedance, that is, the compression of the bar is very small compared to a compressive force exerted thereon. Thus, as the wheel 12 rotates and the ball 72 comes into contact with the surface of the metal strip 10, the ball is forced into the surface and an indentation of constant predetermined depth results. As the ball is forced into the surface of the metal, a compressive force is exerted on the magnetostrictive element 71 which causes a change in the magnetic characteristics of the element.

When one of the coils 75, 76 is energized from a suitable source of voltage, the change in the magnetic characteristics of the element 71 changes the magnetic coupling between the coils 75, 76 and the signal coupled from one coil to the other changes in amplitude. That change in amplitude is an indication of the amount of force exerted to make the indentation of predetermined depth in the metal strip 10.

Fig. 6 illustrates the electrical circuit of the form of the invention shown in Fig. 5. One of the coils, for example, the coil 75, may be energized from a conventional voltage source 86 that may be either of the alternating current or the direct current type. The other coil 76, which is coupled to the coil 75 by virtue of the magnetic properties of the magnetostrictive element 71, may be connected to a conventional indicator 87.

If the voltage source 86 provides an alternating current voltage, there is a continuous alternating current output from the coil 76. When the magnetostrictive element 71 is compressed while an indentation is made, the coupling between the coils 75 and 76 is increased to provide an output from the coil 76 of increased amplitude. The indicator 87 may comprise a conventional peak detector and a direct current voltmeter to indicate the amplitude of the output from the coil 76. The change in amplitude of that output is proportional to the force exerted to make the indentation in the strip 10 and hence is proportional to the hardness of the strip.

The voltage source 86 may be of the type to provide direct current to the coil 75. In that event, there is no output from the coil 76 while the ball 72 is out of contact with the surface of the strip being tested, because the magnetostrictive properties of the element 71 are not changing. However, when the magnetic properties of the element 71 are changed by the compressive force exerted on the element while an indentation is made, a pulse-like signal appears across the coil 76. That signal may be rectified by a peak detector and its amplitude read on a conventional direct current voltmeter. The amplitude of the pulse is proportional to the force exerted to make the indentation and to the hardness of the material under test.

The apparatus is illustrated as including only a single indenting means carried by the wheel 12. However, as many indenting means may be distributed about the periphery of the wheel 12 as are desirable for any particular application. If a sufficient number of indenting means are provided, the indication of hardness may be virtually continuous. Furthermore, the wheel 12 may be of any desired diameter so that the hardness measurements may be made at points spaced apart along the length of the strip by any desired amount.

If the thickness of the material 10 being tested is varied by any significant amount, the apparatus may be easily adapted for the changed thickness by merely replacing the blocks 17 on which the supporting wheel 11 is mounted, with blocks having the proper thickness. Alternatively, the supporting wheel 11 may be replaced by one having a different diameter. Thus, the installation may be varied to be applicable to measuring the hardness of materials of various thicknesses.

If desired, the blocks 17 may be spring mounted to adjust for momentarily varying thicknesses of the strip 10, provided the forces exerted on the blocks 17 by the spring mountings exceed those necessary for the indenting means utilized. Thus, the wheels 11 and 12 may remain in intimate contact with strip 10 at all times.

It is now apparent that the invention attains the objectives set forth. Apparatus embodying the invention is sturdy in construction and well adapted for use in conjunction with heavy industrial processes. Hardness measurements may be made at regularly spaced points along a length of material with the spacing determined by the construction of the apparatus. The electronic apparatus embodied in the invention is conventional and reduced to a minimum.

Although several embodiments of the invention have been illustrated, the invention is not limited thereto since many modifications may be made by one skilled in the art, and it is intended by the appended claims to cover all such modifications as fall within the true spirit and scope of the invention.

What I claim as new and desire to secure by Letters Patent of the United States is:

1. Apparatus for determining hardness of a moving material comprising movable supporting means, indenting means movably carried by said supporting means for making an indentation in said material, means coupled to said supporting means for imparting cyclical movement in response to movement of said material whereby said indenting means periodically makes indentations in the moving material along its length, means mounted in said supporting means and coupled to said indenting means for providing an indication of the depth of said indentation, and means disposed between said supporting means and said indenting means for providing an indication of the force exerted to make said indentation.

2. Apparatus for determining hardness of a moving strip of material comprising movable supporting means, indenting means movably carried by said supporting means for making an indentation in said material, means coupled to said supporting means for imparting cyclical movement in response to movement of said material whereby said indenting means periodically makes indentations in the moving material along its length, means mounted in said supporting means and coupled to said indenting means for providing an electrical signal whose amplitude is proportional to the depth of said indentation, and means disposed between said supporting means and said indenting means for providing an electrical signal whose amplitude is proportional to the force exerted to make said indentation.

3. Apparatus for determining hardness of a continuously moving strip of material comprising movable supporting means, indenting means movably carried by said supporting means for making an indentation in said material, means coupled to said supporting means for imparting movement in response to movement of said material whereby said indenting means periodically makes indentations in the moving material along its length, means mounted in said supporting means and coupled to said indenting means for providing an electrical signal whose amplitude is proportional to the depth of said indentation, means disposed between said supporting means and said indenting means for providing an electrical signal whose amplitude is proportional to the force exerted to make said indentation, and means connected to receive said force proportional signal and said depth proportional signal for obtaining an indication of the ratio of the amplitudes of said signals.

4. Apparatus for determining hardness of a moving material comprising rotatable supporting means adapted to rotate in synchronism with movement of said material, indenting means movably carried by said supporting means for making an indentation in said material, means mounted in said supporting means and coupled to said indenting means for providing an indication of the depth of said indentation, and means coupled between said supporting means and said indenting means for providing an indication of the force exerted to make said indentation.

5. Apparatus for determining hardness of a moving material comprising rotatable supporting means adapted to rotate in synchronism with movement of said material, indenting means movable carried by said supporting means for making an indentation in said material, means mounted in said supporting means and coupled to said indenting means for providing an electrical signal whose amplitude is proportional to the depth of said indentation, and means carried by said supporting means and positioned to receive forces applied to said indenting means for providing an electrical signal whose amplitude is proportional to the force exerted to make said indentation.

6. Apparatus for determining hardness of a material comprising a wheel adapted to rotate with its peripheral surface in contact with said material, indenting means movably carried by said wheel and extending outwardly past said peripheral surface for making an indentation in said material, means mounted in said wheel and coupled to said indenting means for providing an indication of the depth of said indentation, and means carried by said supporting means and positioned to receive forces applied to said indenting means for providing an indication of the force exerted to make said indentation.

7. Apparatus for determining hardness of a material comprising a wheel adapted to rotate with its peripheral surface in contact with said material and having a bore extending inwardly from said peripheral surface, indenting means movably located within said bore and extending outwardly past said peripheral surface for making an indentation in said material, means mounted in said wheel and coupled to said indenting means for providing an indication of the depth of said indentation, and means carried by said supporting means and positioned to receive forces applied to said indenting means for providing an indication of the force exerted to make said indentation.

8. In apparatus for determining hardness of a moving material, the combination of rotatable supporting means adapted to rotate in synchronism with movement of said material, indenting means movably carried by said supporting means for making an indentation in said material, and means mounted in said supporting means and coupled to said indenting means for providing an indication of the depth of said indentation in response to movement of said indenting means.

9. In aparatus for determining hardness of a moving material, the combination of rotatable supporting means adapted to rotate in synchronism with movement of said material, indenting means movably carried by said supporting means for making an indentation in said material, and means mounted in said supporting means and coupled to said indenting means for providing an electrical signal whose amplitude is proportional to the depth of said indentation in response to movement of said indenting means.

10. In apparatus for determining hardness of a material, the combination of a wheel adapted to rotate with its peripheral surface in contact with said material, indenting means movably carried by said wheel and extending outwardly past said peripheral surface for making an indentation in said material, and means mounted in said wheel and coupled to said indenting means for providing an indication of the depth of said indentation in response to movement of said indenting means.

11. In apparatus for determining hardness of a material, the combination of a wheel adapted to rotate with its peripheral surface in contact with said material, indenting means movably carried by said wheel and extending outwardly past said peripheral surface for making an indentation in said material, and means mounted in said wheel and coupled to said indenting means for providing an electrical signal whose amplitude is proportional to the depth of said indentation in response to movement of said indenting means.

12. In apparatus for determining hardness of a material, the combination of a wheel adapted to rotate with its peripheral surface in contact with said material and having a bore extending inwardly from said peripheral surface, indenting means movably located within said bore and extending outwardly past said peripheral surface for making an indentation in said material, and means mounted in said wheel and coupled to said indenting means for providing an indication of the depth of said indentation in response to relative movement between said wheel and indenting means.

13. In apparatus for determining hardness of a material, the combination of a wheel adapted to rotate with its peripheral surface in contact with said material and having a bore extending inwardly from said peripheral surface, indenting means movably located within said bore and extending outwardly past said peripheral surface for making an indentation in said material, and means mounted in said wheel and coupled to said indenting means for providing an electrical signal whose amplitude is proportional to the depth of said indentation in response to movement of said indenting means.

14. In apparatus for determining hardness of a moving strip of material, the combination of movable supporting means, indenting means movably carried by said supporting means for making an indentation in said material, means coupled to said supporting means for imparting cyclical movement in response to movement of said material whereby said indenting means periodically makes an indentation in the moving material along its length, and means carried by said supporting means and positioned to receive forces applied to said indenting means for providing an indication of the force exerted to make said indentation.

15. In apparatus for determining hardness of a continuously moving strip of material, the combination of movable supporting means, indenting means movably carried by said supporting means for making an indentation in said material, means coupled to said supporting means for imparting movement thereto in response to movement of said material whereby said indenting means periodically makes indentations in the moving material along its length, and means disposed between said supporting means and said indenting means for providing an electrical signal whose amplitude is proportional to the force exerted to make said indentation.

16. In apparatus for determining hardness of a moving material, the combination of rotatable supporting means adapted to rotate in synchronism with movement of said material, indenting means carried by said supporting means for making an indentation in said material, and means carried by said supporting means and positioned to receive forces applied to said indenting means for providing an indication of the force exerted to make said indentation.

17. In apparatus for determining hardness of a material, the combination of a wheel adapted to rotate with its peripheral surface in contact with said material, indenting means carried by said wheel and extending outwardly past said peripheral surface for making an indentation in said material, and means carried by said supporting means and positioned to receive forces applied to said indenting means for providing an indication of the force exerted to make said indentation.

18. In apparatus for determining hardness of a material, the combination of a wheel adapted to rotate with its peripheral surface in contact with said material and having a bore extending inwardly from said peripheral surface, indenting means located within said bore and extending outwardly past said peripheral surface for making an indentation in said material, and means carried by said supporting means and positioned within said bore to receive forces applied to said indenting means for providing an indication of the force exerted to make said indentation.

19. Apparatus for determining the hardness of a continuously moving material comprising movable supporting means, indenting means movably carried by said supporting means for making indentations in said material, means for imparting movement to said supporting means in synchronism with the movement of the material whereby said indenting means periodically makes indentations in the moving material along its length, means carried by said supporting means and positioned to sense movement of said indenting means for providing an indication of the depth of said indentation, and means carried by said supporting means and positioned to receive forces applied to said indenting means for providing an indication of the force exerted to make said indentation.

20. In apparatus for determining hardness of a moving strip of material, the combination of movable means, indenting means movably carried by said supporting means, means coupled to said supporting means for imparting movement in synchronism with the movement of the material whereby said indenting means periodically makes indentations in the moving material along its length, and means carried by said supporting means and positioned to receive forces applied to said indenting means for providing an indication of the force exerted to make said indentation.

References Cited in the file of this patent

UNITED STATES PATENTS

| | | |
|---|---|---|
| 1,982,026 | Shore | Nov. 27, 1934 |
| 2,038,487 | Gogan | Apr. 21, 1936 |
| 2,441,283 | O'Hara | May 11, 1948 |
| 2,554,206 | Pearson et al. | May 22, 1951 |
| 2,569,987 | Frondel | Oct. 2, 1951 |
| 2,619,831 | Sklar | Dec. 2, 1952 |
| 2,683,989 | Clark | July 20, 1954 |
| 2,734,736 | Payne | Feb. 14, 1956 |

FOREIGN PATENTS

| | | |
|---|---|---|
| 750,779 | Germany | Jan. 20, 1945 |